United States Patent [19]

Angevine et al.

[11] Patent Number: 4,781,817

[45] Date of Patent: Nov. 1, 1988

[54] HYDROGEN BRONZE CATALYST AND IMPROVED RESID UPGRADING PROCESSES USING IT

[75] Inventors: Philip J. Angevine, West Deptford; Arthur W. Chester, Cherry Hill, both of N.J.; Thomas F. Degnan, Yardley, Pa.; Garry W. Kirker, Washington Twp., N.J.

[73] Assignee: Mobil Oil Corporation, New York, N.Y.

[21] Appl. No.: 938,084

[22] Filed: Dec. 4, 1986

[51] Int. Cl.$^4$ .............................................. C10G 45/04
[52] U.S. Cl. ................................. 208/216 R; 208/213; 208/251 H; 208/254 H; 502/321; 502/353
[58] Field of Search ............... 208/213, 216 R, 251 H, 208/254 H; 502/321, 353

[56] References Cited

U.S. PATENT DOCUMENTS

| | | | |
|---|---|---|---|
| 3,094,480 | 6/1963 | Richardson | 208/216 R |
| 3,112,257 | 11/1963 | Douwes et al. | 208/216 R |
| 3,546,103 | 12/1970 | Hammer et al. | 208/211 |
| 3,755,146 | 8/1973 | Harris et al. | 208/112 |
| 4,016,067 | 4/1977 | Fischer | 208/89 |
| 4,052,296 | 10/1977 | Montagna | 208/216 |
| 4,080,296 | 3/1978 | Clark | 210/323 R |

OTHER PUBLICATIONS

"Mat. Res. Bull.", vol. 14, pp. 369-376 *Ionic Bonding Model of the Pyridine Intercalation Compounds of Layered Transition Metal Dichalcogenides.*
"Angew. Chem. Int. Ed. Engl., 19, 983-1003 (1980) *Reversible Topotactic Redox Reactions of Solids by Electron/Ion Transfer.*
"Intercalation Chemistry", pp. 315-360 *Solvated Intercalation Compounds of Layered Chalcogenide and Oxide Bronzes.*
*New Catalytic Materials: Volume VII Layered Structured as Novel Catalysts* "Ind. Eng. Chem. Process Des. Dev., vol. 16, No. 4, 1977 pp. 525-528.
*Fresh Water Manganese Nodules as a Catalyst for Demetalizing and Desulfurizing Petroleum Residua.*
*The Shaker Bomb*, John W. Payne, Carl W. Streed and Eric R. Kent, R & D Lab., Socony Mobil Oil Co. Inc., Paulsboro, N.J.

*Primary Examiner*—Asok Pal
*Assistant Examiner*—Helane Myers
*Attorney, Agent, or Firm*—Alexander J. McKillop; Michael G. Gilman; Marina V. Schneller

[57] ABSTRACT

The present invention relates to resid hydrotreating with hydrogen bronze catalyst which unexpectedly achieve superior demetallization compared to large pore CoMo/Al$_2$O$_3$ catalyst.

16 Claims, No Drawings

HYDROGEN BRONZE CATALYST AND IMPROVED RESID UPGRADING PROCESSES USING IT

BACKGROUND OF THE INVENTION

1. Field of the Invention

This invention is directed to a hydrogen bronze catalyst and a process for using it in hydrotreating various petroleum resids.

2. Discussion of the Prior Art

It is well known that many if not most petroleum base stocks contain contaminants, as for example, sulfur, nitrogen and metals. It is desirable particularly if these feedstocks are to be further processed that the contaminants be removed. This is an operation usually requiring use of a catalyst.

It has been conventional in the art to effect sulfur removal from hydrocarbon stocks by subjecting them to treatment with hydrogen at elevated temperature and pressure while in contact with a catalyst containing hydrogenating components. Typically the hydrogenating components of such prior art catalysts are Group VIB or Group VIII metals, or other oxides or sulfides. These hydrogenating components may be supported on a variety of well known carriers, for example alumina, kieselguhr, zeolitic molecular sieves and other materials having high surface areas: U.S. Pat. No. 4,052,296. U.S. Pat. No. 3,546,103 teaches hydrodesulfurization with a catalyst of cobalt and molybdenum on an alumina base. U.S. Pat. No. 3,755,146 describes a process for preparing lube oils characterized by low pour points which utilizes a catalyst mixture comprising hydrogenation components, a conventional cracking catalyst which can be either crystalline or amorphous and a crystalline aluminosilicate of the ZSM-5 type.

Hydrotreating of distillates may be defined simply as the removal of sulfur, nitrogen and metal compounds by selective hydrogenation. The hydrotreating catalysts used commercially are cobalt plus molybdenum or nickel plus molybdenum used in the sulfided forms and impregnated on an alumina base. The hydrotreating operating conditions are such that appreciable hydrogenation of aromatics does not occur; these are about 1,000 to 2,000 psi hydrogen and about 700° F. The theoretical hydrogen consumption should be that required to hydrogenate the sulfur, nitrogen and metal containing molecules and produce hydrogen sulfide and ammonia. However, the desulfurization reactions are invariably accompanied by small amounts of hydrogenation and hydrocracking, the extent of which depends on the nature of the feedstock and the severity of desulfurization.

However, neither the prior art mentioned above nor any art known to applicants have combined in a single stage operation the hydrotreating of petroleum resids with a thermally stable catalytic support material containing at least about 10 wt % layered metal oxide hydrogen bronze. This hydrotreatment of petroleum resid results in an improved demetallized product compared to that obtained with CoMo/Al$_2$O$_3$ catalyst.

Because of the high pressures required for the hydroprocessing of resids, it is extremely desirable from an economic standpoint to minimize reactor volume. Use of these layered metal oxide bronze materials with a suitable support for upgrading of resids will allow the refiner to attain the required degree of metals removal with less catalyst and therefore in a smaller reactor. Alternatively, using the hydrogen bronze based catalyst in existing reactors will allow refiners to run at lower reaction severities or to attain process resid with improved quality. The process of the present invention would apply to, for example, FCC feed pretreatment. With this in mind, applicants will proceed with a summary of the novel features of the present invention.

SUMMARY OF THE INVENTION

The present invention relates to an improved petroleum resid upgrading process comprising hydrotreatment of resid with a layered metal oxide hydrogen bronze.

The invention also relates to an improved petroleum resid upgrading process comprising hydrotreatment of resid with a physical mixture of about 10 wt % SiO$_2$ and about 90 wt % H$_{0.5}$MoO$_3$ layered bronze in a fixed bed downflow reactor at hydrogen partial pressure greater than about 400 psig, temperature ranging between about 675° F. to about 850° F. and liquid hourly space velocity between 0.1 and about 10 hr$^{-1}$ and recovering an improved demetallized product compared to that obtained with CoMo/Al$_2$O$_3$ catalyst.

The invention further relates to a hydrotreating catalyst comprising a thermally stable catalytic support material containing layered metal oxide hydrogen bronze.

The invention still further relates to a hydrotreating catalyst for petroleum resid upgrading process comprising a physical mixture of about 10 wt % SiO$_2$ and about 90 wt % H$_{0.5}$MoO$_3$ layered bronze having improved demetallization activity compared to CoMo/Al$_2$O$_3$ catalyst.

DESCRIPTION OF THE PREFERRED EMBODIMENTS

The present invention is predicated on the discovery that hydrotreatment of petroleum resid with thermally stable catalytic support material containing at least about 10 wt % layered metal oxide hydrogen bronze unexpectedly improves demetallization of the resid compared to similar treatment with a conventional CoMo/Al$_2$O$_3$ catalyst.

Hydrogen bronze can be defined as an insertion compound of atomic hydrogen in an oxide or chalcogenide, in which there is no formal chemical bond between the anion of the host lattice—either O$^=$ or S$^=$—and the inserted element. See D. Tinet, H. Estrade-Szwarckopf and J. J Fripiat, Bull. Soc. Fr. Phys., 42, 28 (1981), which is hereby incorporated by reference, for more detail concerning hydrogen bronze. While the bronzes of interest here are of the oxides, under hydroprocessing conditions some sulfiding may occur. The term "hydrogen bronze" is based on the material's metallic lustre and associated electronic properties.

The synthesis and structure of H$_{0.5}$(MoO$_3$) has been described by Schollhorn. See R. Schollhorn, H. D. Zagefka, T. Butz and A. Lerf, Mater. Res. Bull., 14, 369 (1979); R. Schollhorn, Angew. Chem. Int. Ed. Engl., 19, 983 (1980); and R. Schollhorn, *Intercalation Chemistry*, M. S. Whittingham and A. J. Jacobson, Eds., Academic Press, New York, 315 ff (1982) which are hereby incorporated by reference.

The synthesis and structure of H$_{0.5}$(MoO$_3$) has been described in the literature. A review of layered materials by Catalyticia Associates states that although the catalytic chemistry of MoO$_3$ is well documented, there is little reported catalysis resulting directly from the layered nature of $MoO_3$. See Catalyticia Associates Inc., *New Catalytic Materials: Volume VII, Layered Structures As Novel Catalysts*, Multiclient Study No. 4183 LS, Mountain View, Calif., 188 ff (1983), which is hereby incorporated by reference.

As mentioned, this invention relates to the use of hydrogen bronze. Examples are molybdenum bronze ($H_xMoO_3$), tungsten bronze ($H_yWO_3$), and vanadium bronze ($H_zV_2O_5$). The concentration of hydrogen in the hydrogen bronze is designated by the subscripts x, y and z and is preferably about 0.5. Other bronzes included among the Group VB and Group VIB metals of the Periodic Table of Elements, for example, niobium. A specific molybdenum bronze $H_xMoO_3$, was utilized in the experimentation of this invention.

The catalyst mixture is a physical mixture of a conventional, thermally stable catalytic support material with the hydrogen bronze. The hydrogen bronze comprises at least about 10 wt % of the physical mixture. The preferred concentration is about 90 wt %. The mixture is then extruded or bound according to conventional catalyst preparation techniques.

The hydrogen bronze may be supported on a variety of well known carriers, for example, alumina, kiselguhr, zeolitic molecular sieves and other materials having high surface areas. The support material is preferably alumina.

The resid upgrading process can be carried out on a conventional fixed bed downflow (trickle bed) reactor at a hydrogen partial pressure greater than about 400 psig, temperatures ranging from about 675° F. to about 850° F. and a liquid hourly space velocity of between about 0.1 and about 10 $hr^{-1}$. These conditions are conventional, and selection is well within the skill of a person having ordinary skill in the art.

EXPERIMENTAL

The present invention will now be illustrated by examples which are not intended to limit the scope of the present application.

To specifically illustrate the inventive process, resid and catalyst were utilized in the exemplary material described below. The properties of this residuum are shown in Table 1:

TABLE 1

Properties of the Arab Light Vacuum Resid

| Elemental Analysis (wt %) | |
|---|---|
| Hydrogen | 10.68 |
| Sulfur | 3.93 |
| Nitrogen | .31 |
| CCR and Asphaltenes Analysis (wt %) | |
| CCR | 16.96 |
| Asphaltenes (n-C$_5$ insolubles) | 10.93 |
| Metals Analysis (ppm) | |
| Nickel | 16 |
| Vanadium | 65 |
| Iron | 12 |
| Sodium | 6 |
| Kinematic Viscosity (cs) | |
| 212° F. | 496.2 |
| 300° F. | 24.6 |

Experiments were made with the Arab Light Vacuum Resid. One run utilized a $CoMo/Al_2O_3$ catalyst described in U.S. Pat. No. 4,016,067, the entire content of which is hereby incorporated by reference. This catalyst is a conventional state-of-the-art demetallization catalyst used for catalyst comparison. Specific properties of this catalyst are set forth in the following table:

TABLE 2

$CoMo/Al_2O_3$ Resid Demetalation Catalyst Properties

| Metals Loading (wt %) | |
|---|---|
| CoO | 3.5 |
| $MoO_3$ | 10.0 |
| Physical Properties | |
| Surface Area, m$^2$/g | 109 |
| Real Density, g/cc | 3.629 |
| Particle Density, g/cc | 1.221 |
| Pore Volume, cc/g | 0.543 |
| Avg. Pore Dia, A | 199 |
| Pore Size Distribution, % | |
| Pore Volume in Pores of diameter (A) | |
| 0–30 | 11 |
| 30–50 | — |
| 50–80 | — |
| 80–100 | 2 |
| 100–150 | 24 |
| 150–200 | 34 |
| 200–300 | 17 |
| 300+ | 12 |

The catalyst used in other experiments have the properties set forth in the following table:

TABLE 3

Properties of the $H_{0.5}(MoO_3)$ and $MoO_3$ Catalysts Used

| | $MoO_3$ | $H_{0.5}(MoO_3)$ | 10% $SiO_2$ 90% Moly Bronze |
|---|---|---|---|
| Density, g/cc | | | |
| Packed | 1.59 | 1.42 | 1.34 |
| Particle | not available | not available | 2.21 |
| Real | 4.90 | 4.68 | 3.98 |
| Pore Volume, cc/g | 0.01 | 0.05 | 0.201 |
| Surface Area, m$^2$/g | <5.0 | 5.0 | 20 |
| Avg. Pore Diameter, A | not determined | not determined | 402 |
| Pore Size Distribution, % | | | |
| Pore Volume in Pores of diameter (A) | | | |
| 0–30 | | | 1 |
| 30–50 | | | 1 |
| 50–80 | | | 6 |
| 80–100 | | | 4 |
| 100–150 | | | 7 |
| 150–200 | | | 6 |
| 200–300 | | | 10 |
| 300+ | | | 64 |

TABLE 3-continued

| Properties of the $H_{0.5}$ (MoO$_3$) and MoO$_3$ Catalysts Used | | | |
|---|---|---|---|
|  | MoO$_3$ | $H_{0.5}(MoO_3)$ | 10% SiO$_2$ 90% Moly Bronze |
| Sorption Capacity, wt % | | | |
| H$_2$O |  | 0.0 | 0.9 |
| Cyclohexane |  | 0.1 | 0.7 |
| Hexane |  | 0.1 | 0.9 |
| SiO$_2$, wt % | — | — | 14.8 |
| MoO$_3$, wt % | 100 | — | — |
| Mo, wt % | 66.7* | 67.4 | 54.8 |
| Zn, wt % |  | 0.013 |  |
| Ash, wt % |  | 95.7 | 83.1 |

*Theoretical value.

EXAMPLES

Two $H_{0.5}(MoO_3)$ catalysts were compared against MoO$_3$ for metals, sulfur, CCR and asphaltene removal in shaker bomb experiments with Arab Light vacuum resid. Shaker bomb testing very closely simulates the resid upgrading activities observed in continuous downflow units. See S. M. Oleck and H. S. Sherry, *Fresh Water Manganese Nodules As a Catalyst For Demetallizing and Desulfurizing Petroleum Residua*, Ind. Eng. Chem., Process Des. Dev. 16 (4) 525 (1977) which is hereby incorporated by reference. Properties of the $H_{0.5}(MoO_3)$ catalyst are given in Table 3 while the properties of the Arab Light vacuum resid are given in Table 1. In a series of three experiments, the $H_{0.5}(MoO_3)$ catalyst and the MoO$_3$ were contacted with the resid in a shaker bomb apparatus at the following conditions:

| Oil, Catalyst (wt:wt) | 20 |
|---|---|
| Temperature °C. | 400 |
| Hydrogen Pressure, psig | 2000 |
| Reaction Time, min. | 80 |

The shaker bomb apparatus is described in J. W. Payne, C. W. Streed, and E. R. Kent, *The Shaker Bomb—A New Laboratory Tool For Studying Thermal Processes*, Ind. Eng. Chem., 50 (1), 47 (1958), which is hereby incorporated by reference. At the conclusion of each run, the catalyst and the oil were separated and both components were analyzed. The effectiveness of each catalyst for resid upgrading was determined by comparing the degree of demetallization, desulfurization, CCR removal, etc. to that observed in an identical run in which a conventional CoMo/Al$_2$O$_3$ catalyst was used. Properties of the latter catalyst are given in Table 2. Thermal contributions were determined from a "blank" run at identical conditions but with no catalyst present.

Table 4 presents the results of catalyst activity comparison:

TABLE 4

|  | Thermal | CoMo/Al | MoO$_3$ | Moly. Brz. $H_{0.5}(MoO_3)$ | 10% SiO$_2$ 90% Moly. Bronze |
|---|---|---|---|---|---|
| Conditions | | | | | |
| Temp., °C. | 400 | 400 | 400 | 400 | 400 |
| Press, psig | 2000 | 2000 | 2000 | 2000 | 2000 |
| Oil/Cat. | infinite | 20 | 20 | 20 | 20 |
| Time, min. | 80 | 80 | 80 | 80 | 80 |
| Conversion to 1000° F.$^-$, % | 13 | 14.7 | 6.9 | None |  |
| TLP Analysis | | | | | |
| Hydrogen, wt % | 10.58 | 10.69 | 10.30 | 10.26 | 10.11 |
| Sulfur, wt % | 3.47 | 2.52 | 3.72 | 3.48 | 3.87 |
| Nitrogen, wt % | 0.32 | 0.26 | 0.22 | 0.18 | 0.20 |
| Vanadium, ppm | 70 | 40 | 56 | 17 | 34 |
| CCR, wt % | 16.00 | 13.55 | 16.01 | 17.91 | 17.37 |
| Asphaltenes, wt % | 8.52 | 5.40 | 6.40 | 5.50 | 6.98 |
| Vanadium Removal, % | — | 38 | 14 | 77 | 48 |
| CCR Removal, % | 6 | 20 | 6 | — | — |
| Sulfur Removal, % | 12 | 36 | 5 | 11 | 2 |
| Asphaltenes Removal, % | 22 | 51 | 41 | 50 | 36 |

The table shows that the $H_{0.5}(MoO_3)$ and SiO$_2$ bound $H_{0.5}(MoO_3)$ materials both have resid upgrading activities greater than MoO$_3$ alone. Moreover, it can be seen that these molybdenum bronze materials are also superior to the standard CoMo/Al$_2$O$_3$ catalyst in demetallization activity beyond what is known in the prior art. Demetallization activity is one of the most important performance criteria in good resid upgrading catalyst, and consequently the present invention makes a substantial advance in the art.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. An improved petroleum resid upgrading process comprising hydrotreatment of resid with a hydrogen bronze, which comprises a layered metal oxide and/or sulfide of a metal selected from the group consisting of Group VB and Group VIB metals, containing inserted atomic hydrogen's wherein there is no formal chemical bond between the $O^=$ or $S^=$ anion of said layered metal oxide and/or sulfide, and said atomic hydrogen; said hydrotreatment being carried out at a hydrogen partial pressure greater than about 400 psig, temperature ranging between about 675° F. to about 850° F. and liquid hourly space velocity between about 0.1 and about 10 $hr^{-1}$.

2. The improved upgrading process according to claim 1, further comprising the hydrogen bronze being a molybdenum bronze.

3. The improved upgrading process according to claim 1, further comprising said hydrotreatment of resid being with a thermally stable catalytic support material containing at least about 10 wt % hydrogen bronze.

4. The improved upgrading process according to claim 2, further comprising the molybdenum bronze having the formula $H_{0.5}MoO_3$.

5. The improved upgrading process according to claim 4, further comprising a concentration of molybdenum bronze being about 90 wt %.

6. The improved upgrading process according to claim 1, further comprising the hydrogen bronze being a tungsten bronze.

7. The improved upgrading process according to claim 1, further comprising the hydrogen bronze being a vanadium bronze.

8. The improved upgrading process according to claim 1, further comprising the metal of the hydrogen bronze being niobium.

9. The improved upgrading process according to claim 1, further comprising a vacuum resid.

10. The improved upgrading process according to claim 1, further comprising an atomospheric resid.

11. The improved upgrading process according to claim 1, further comprising a physical mixture of the thermally stable catalytic support material and the hydrogen bronze.

12. The improved upgrading process according to claim 1, further comprising upgrading in a fixed bed downflow reactor.

13. The improved upgrading process according to claim 12, further comprising the reactor being a trickle bed reactor.

14. The improved upgrading process according to claim 1, further comprising a $SiO_2$ support.

15. An improved petroleum resid upgrading process comprising hydrotreatment of resid with an extruded mixture of about 10 wt % $SiO_2$ and about 90 wt % $H_{0.5}MoO_3$ layered bronze in a fixed bed downflow reactor at hydrogen partial pressure greater than about 400 psig, temperature ranging between about 675° F. to about 850° F. and liquid hourly space velocity between about 0.1 and 10 $hr^{-1}$ and recovering an improved demetallized product compared to that obtained with $CoMo/Al_2O_3$ catalyst, wherein said layered bronze comprises a layered metal oxide of molybdenum, containing inserted atomic hydrogen, wherein there is no formal bond between the $O^=$ anion of said layered metal oxide and said atomic hydrogen.

16. The improved upgrading process according to claim 1, wherein said layered metal oxide and/or sulfide is a layered metal oxide.

* * * * *